Nov. 16, 1937.   C. L. CLARK ET AL   2,099,051
SKID PLATFORM
Filed Oct. 28, 1936   2 Sheets-Sheet 1

Inventors
Carl L. Clark and
Albert G. Knowles
By Frease and Bishop
Attorneys

Nov. 16, 1937.  C. L. CLARK ET AL  2,099,051

SKID PLATFORM

Filed Oct. 28, 1936  2 Sheets-Sheet 2

Inventor
Carl L. Clark and
Albert G. Knowles
By Fraser and Bishop
Attorneys

Patented Nov. 16, 1937

2,099,051

UNITED STATES PATENT OFFICE 2,099,051

SKID PLATFORM

Carl L. Clark, Warren, and Albert G. Knowles, Niles, Ohio, assignors, by mesne assignments, to Mullins Manufacturing Corporation, Salem, Ohio, a corporation of New York Application October 28, 1936, Serial No. 107,980

5 Claims. (Cl. 248—120)

The invention relates to material handling platforms commonly called skid platforms, which are used either directly or combined with boxes, stakes, casters, crane hooks, rings, runners, and the like, for storing, handling and transporting parts, both large and small, and heavy or light, in a manufacturing plant.

More particularly, the invention relates to a skid platform made from a single blank of sheet or plate metal, preferably steel, and formed integrally with longitudinally extending legs and spaced stiffening corrugations extending transversely of the platform deck and legs.

A skid platform is usually transported or handled either by a hand or a power operated lift truck, the lifting platform of which is passed underneath the skid platform deck between the legs thereof, and is elevated or lowered for transporting or locating the platform and load carried thereby.

The strength or stiffness of such a skid platform is dependent upon the number and depth of the stiffening corrugations; and these corrugations must run around the corners between the legs and deck so as to provide stiffness and strength at such corners in order to prevent spreading or collapse of the legs when a loaded platform is being handled.

In prior types of skid platforms, failures frequently occur at the corners, particularly at the corner bends in the corrugations, because these corrugation corner bends are not strong enough to withstand, while a skid platform is loaded, the extreme shock to which they may be subjected when the lifting platform of a lifting truck strikes the platform leg with a glancing blow, as the truck lifting platform is entered beneath the skid platform to pick up the skid platform.

A glancing blow of this type frequently bends the leg outward under such severe shock conditions that the metal at the corner bends in the skid platform corrugations cracks or ruptures and the skid platform eventually fails by flattening out.

Accordingly, it is a principal object of the present invention to materially increase the strength of a corrugated sheet or plate metal skid platform at the corners between the platform legs and deck, and particularly at the corner bends in the corrugations thereof.

A further object of the present invention is to provide an improved corrugation arrangement at the corner bends in the corrugations of a corrugated sheet metal skid platform, which will withstand severe shock loads without failure.

In prior types of skid platforms, the metal at the corner bends in the corrugations always has been excessively work hardened when the corners are formed between the platform legs and deck. This work hardening develops brittleness that reduces the ability of such platforms to withstand the shock of a glancing blow; with the result that the brittle areas crack, fracture or rupture, after a slight bending caused by a glancing blow.

Accordingly, it is a further object of the present invention to provide a new spread corrugation arrangement at the corner bends in the corrugations of a corrugated sheet metal skid platform; in which a minimum amount of work hardening occurs at and adjacent to the corner bends in the corrugations; so that the metal thereat retains considerable resilience and therefore ability to withstand severe shock loads without damage or failure.

Moreover, it is an additional object of the present invention to provide an improved corner construction for a corrugated sheet metal skid platform which retains strength and stiffness even though the legs may be excessively bent from a normal location, as a result of a sidewise shock blow, without causing a rupture or failure of the metal at the corner.

Finally, it is an object of the present invention to provide a corrugated sheet metal skid platform with the advantageous features, characteristics and constructions described, in a simple, expeditious and inexpensive manner.

These and other objects may be obtained by the improved construction, a preferred embodiment of which is shown in the accompanying drawings, and is hereinafter described in detail and claimed, which may be stated in general terms as including in sheet metal skid platform construction, a generally horizontally disposed deck; longitudinally extending, substantially vertically disposed, continuous legs formed integrally at each side of the deck with a corner between each leg and the deck; spaced, relatively deep, recessed corrugations traversing the deck and legs; each corrugation being formed at each corner with two relatively shallow, recessed corrugations, divided or spread about an island-like, raised corner corrugation; the grain direction of the metal in the sheet or plate metal blank from which the platform is formed preferably running parallel with the corrugations formed therein.

In the drawings.

Similar numerals refer to similar parts throughout the various figures of the drawings.

Figures 1, 2:
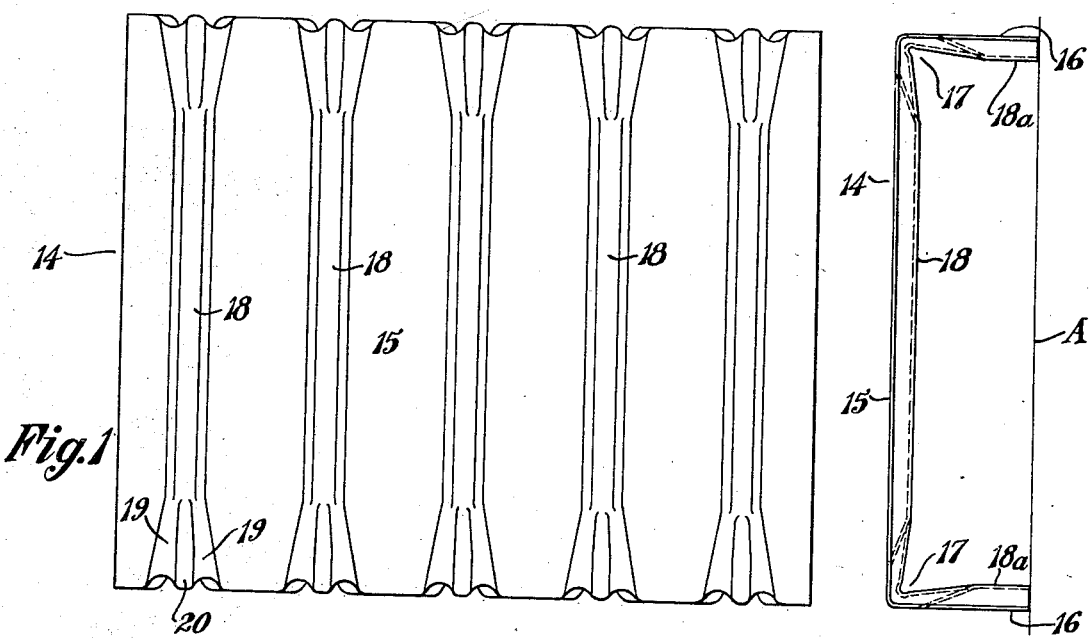
Figure 1 is a plan view of a corrugated sheet metal skid platform having the improved corner corrugation arrangement.
Fig. 2 is an end elevation of the platform shown in Fig. 1.
Figure 3:
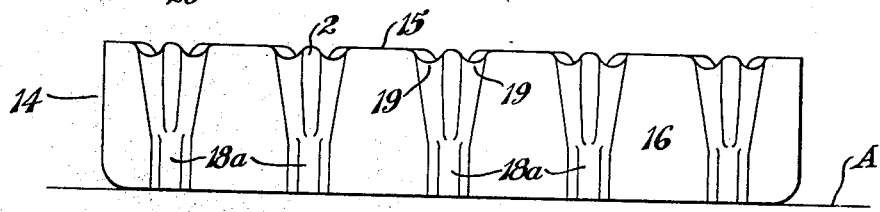
Fig. 3 is a side elevation of the platform shown in Figs. 1 and 2.

A sheet metal skid platform is generally indicated at 14 in Figs. 1, 2 and 3 and includes a horizontally disposed deck generally indicated at 15 and legs generally indicated at 16 formed integrally with the deck. The deck 15 is preferably generally rectangular in outline and is spaced from the floor or the like A by the legs 16 which extend preferably longitudinally of the deck 15 in a generally vertical position and are preferably continuous at the marginal side edges of the deck 15, as shown, thereby forming corners generally indicated at 17 (Fig. 2) between each leg 16 and the deck 15.

A series of spaced, relatively deep, recessed, stiffening corrugations 18 traverse the deck 15 in a crosswise manner and extend downward in each leg 16, as indicated at 18a. The corrugations 18 and 18a are shown as being somewhat trapezoidal-channeled or U-shaped in cross section, but it is understood that the particular shape is not essential, as they may be half-round, V-shaped, or other shape if desired.

Figure 10:
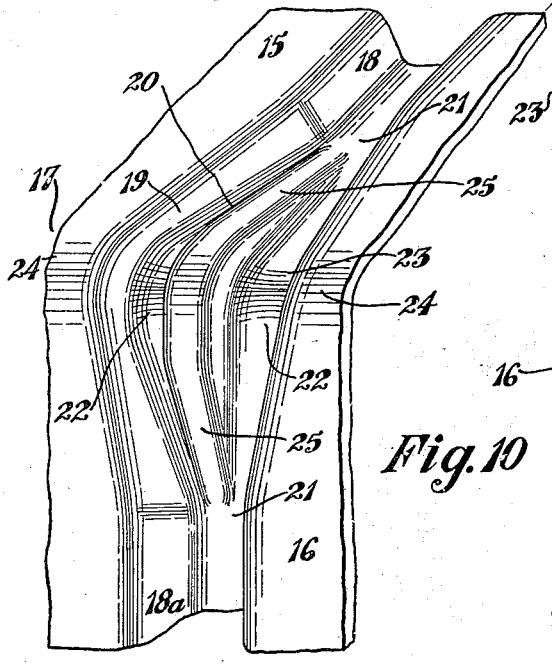
Fig. 10 is a fragmentary perspective view of the improved corner corrugation arrangement.
Figure 9:
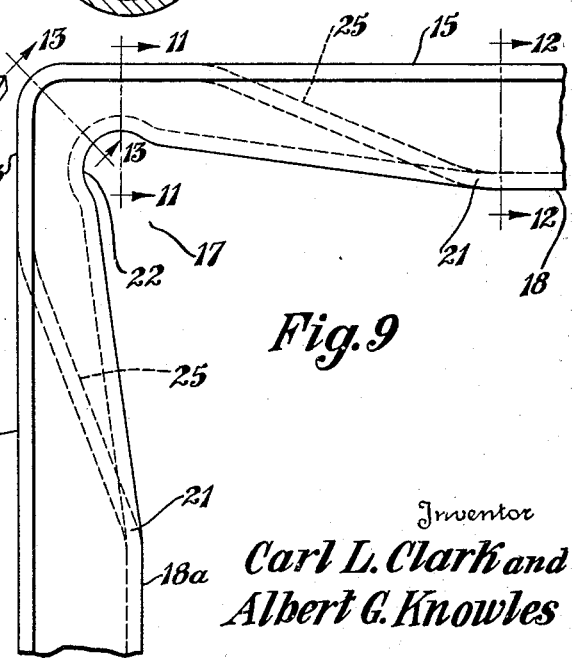
Fig. 9 is an enlarged fragmentary end elevation showing one corner of a skid platform having the improved corner corrugation arrangement.

Referring particularly to Figs. 9 and 10, the deep corrugations 18—18a do not extend around the corners 17, but are formed to provide two relatively shallow corrugations 19, which are recessed as best shown in Fig. 10 and divided or spread about an island-like, raised corner corrugation 20.

The corrugations 19 have a tapering depth, well shown in Fig. 9, running from the regions 21 where they merge with each corrugation 18 and 18a to shallower regions 22 at and adjacent to the corners; and the raised corrugations 20 have corner portions 23 substantially in the plane of the corners 24 between the surface of the deck 15 and the surfaces of the legs 16, and are then tapered as at 25 to merge with the recessed corrugations 19 and corrugations 18 and 18a, at the regions 21.

Figure 4:
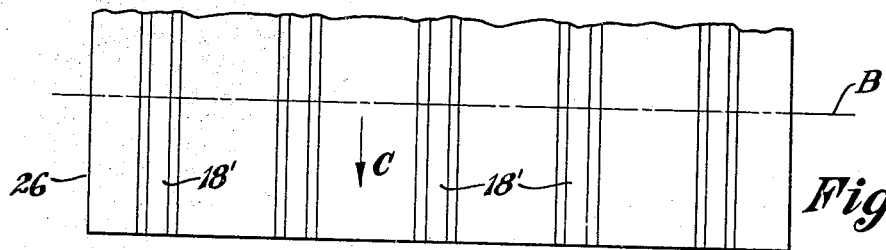
Fig. 4 is a plan view of a portion of a sheet metal blank from which the improved skid platform is made, relatively deep corrugations having been formed therein.
Figure 5:
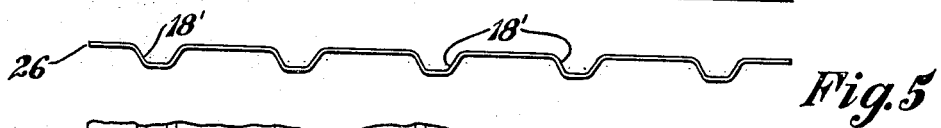
Fig. 5 is an end elevation of the corrugated blank shown in Fig. 4.

The improved skid platform corner construction may be made by utilizing a sheet metal blank indicated at 26 in Figs. 4 and 5 in which deep corrugations 18' have been formed in any desired manner. After the corrugations 18' have been so formed, the sheet blank 26 may have the corrugations 18' thereof re-formed while the blank is flat, to provide the improved corner corrugation areas generally indicated at 19a in Fig. 6, wherein the re-formed blank is indicated generally at 26a. The blank 26a may also have its corners rounded as at 16a.

Figure 6:
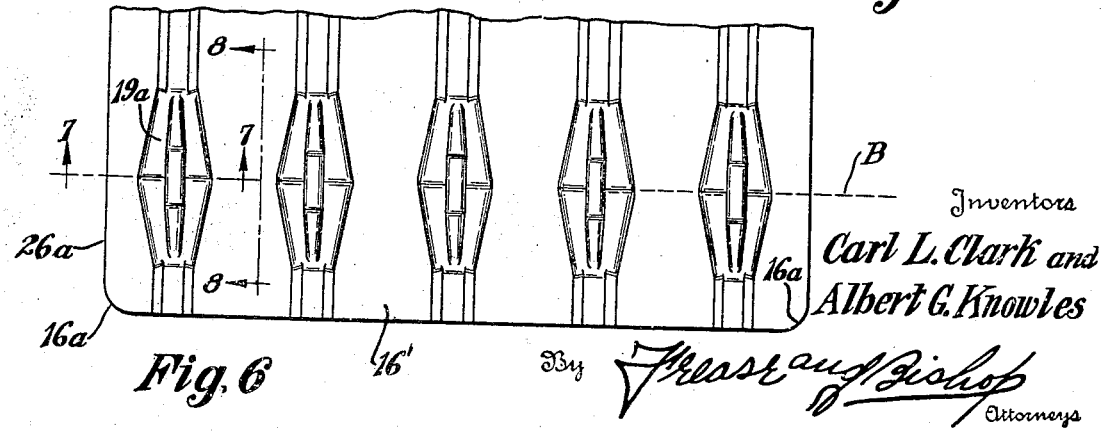
Fig. 6 is a view similar to Fig. 4, showing a re-forming of the corrugations with the improved corner corrugation arrangement in the region where a corner will be formed between the platform deck and a leg thereof.
Figure 7:
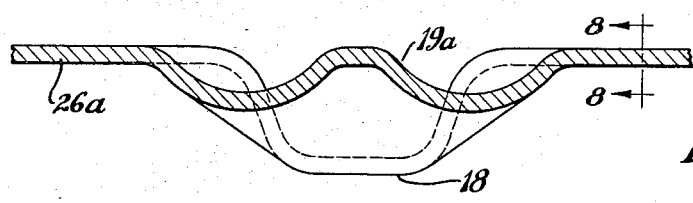
Fig. 7 is an enlarged, fragmentary section taken on the line 7—7, Figs. 6 and 8.
Figure 8:
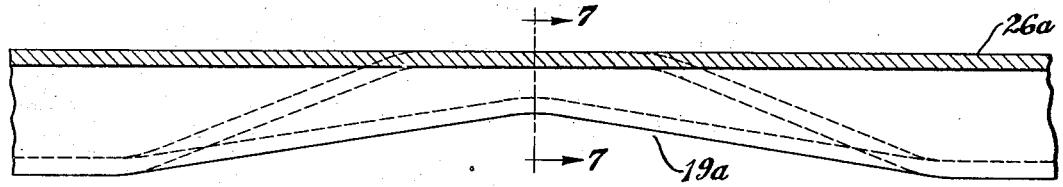
Fig. 8 is an enlarged, fragmentary section taken on the line 8—8, Figs. 6 and 7.

After the formations 19a have been made, the leg portions 16' of the blank 26a may be bent downward along a dash line indicated generally at B in Figs. 4 and 6 to the position shown in Figs. 1, 2 and 3, when the skid platforms 14 are completed.

The re-forming of the areas 19a, as shown in Fig. 6, is preferably accomplished in a single operation, while the sheet metal blank is flat so as to minimize the strain introduced into the metal at the regions of the re-forming. However, it is to be understood that the re-forming operation need not necessarily be accomplished while the blank is flat, but may be performed in the same dies that and by the same operation that performs the leg bending. That is to say, in the manufacture of skid platforms, the blank 26 may be formed in one step from the arrangement shown in Fig. 4 to the completed arrangement shown in Fig. 1.

Moreover, it is unnecessary to first form the deep corrugations 18' and then the re-formed corner regions 19a, because a sheet blank may be initially formed in one operation from a flat to the arrangement shown in Fig. 6.

Figure 11:
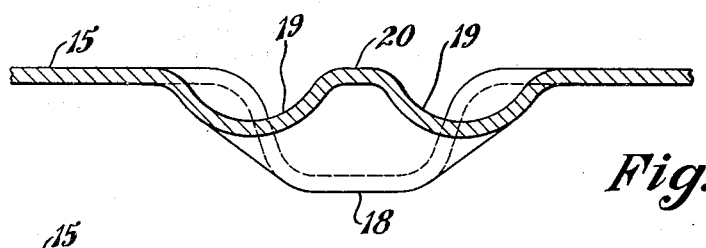
Fig. 11 is a fragmentary section taken on the line 11—11, Fig. 9.
Figure 12:
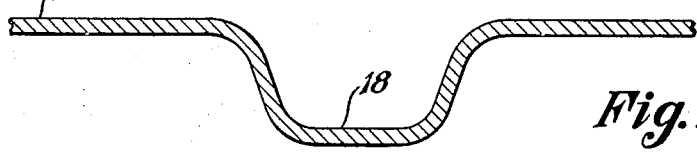
Fig. 12 is a fragmentary section taken on the line 12—12, Fig. 9.
Figure 13:
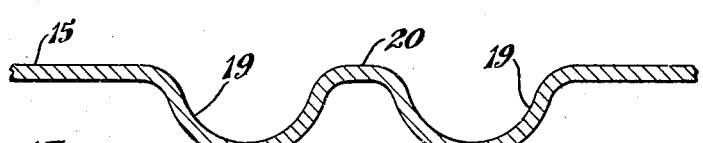
Fig. 13 is a fragmentary section taken on the line 13—13, Fig. 9.

The shallowing and widening of the corrugations 18, and preferably also the dividing of the same to provide the raised corner ribs 20, prevents excessive work hardening of the metal at the corners between the deck 15 and legs 16 of the corrugated sheet metal skid platform 14; it being noted that the metal in the bottom of the shallowed corrugations 19 (see Fig. 13) is closer to the center of gravity of the section throughout the corners, than is the metal in the bottom of the corrugation 18 (see Figs. 11 and 12).

In other words, the metal in the shallow corrugations 19 at the corners between the deck 15 and legs 16 is upset less than would be the case if the deep corrugations 18 were continued around the corners.

This elimination of excessive work hardening of the metal permits the metal at the corners to retain more resilience and to therefore be more resistant to sharp blows. Actual tests have shown that the improved double or spread shallow corner corrugation formations can withstand without fracture or failure, more than double a shock load which may fracture or cause a failure of prior types of corner corrugations.

Moreover, with the improved construction, even through portions of the legs 16 may be severely bent outwardly due to a glancing blow, the legs will still support a load because the corner corrugations do not fail or break, even with excessive bending; as compared with prior types of skid platform corner constructions wherein breakage occurs after only slight bending, due to brittleness incident to work hardening.

We have likewise discovered that when the grain of the metal in the sheet blank 26 runs parallel with the direction of the corrugations 18', as indicated by the arrow C in Fig. 4, the strength of the skid platform corners is increased more than ten percent.

Accordingly, the improved corner construction not only increases the strength of corrugated sheet metal skid platforms so that they will withstand severe shock loads without failure, but it also minimizes the amount of work hardening occurring at and adjacent to the corner bends, particularly in the corrugations, so that the metal retains considerable resilience and strength, even though the legs may be excessively bent as a result of a sidewise shock blow without causing rupture or failure of the metal.

Moreover, the improved construction may be readily incorporated in a corrugated sheet metal skid platform in a very inexpensive manner, either in one of the usual operations of making the same, or by adding only one additional re-forming operation.

It is to be understood that the scope of the invention is not limited to the particular shapes and contours shown, but changes can be made in such contours without departing from the inventions disclosed.

Having now described the features of the invention, preferred methods of making skid platforms in which the inventions are incorporated, and the advantages and results attained thereby; the new and useful parts, elements, devices, combinations and constructions, and reasonable mechanical equivalents thereof obvious to those skilled in the art, are set forth in the appended claims.

We claim:—

1. In a sheet metal skid platform having a deck and legs with corners therebetween formed integrally from a single metal blank, a series of relatively deep corrugations traversing the deck and legs, and relatively shallow and wide corrugations in said corners merging with and joining said deck and leg corrugations.

2. In a sheet metal skid platform having a deck and marginal upright legs with corners therebetween formed integrally from a single metal blank, a relatively deep stiffening corrugation traversing the deck, a relatively deep stiffening corrugation extending upward in each leg, and a relatively shallow and wide, tapered corrugation running around each corner, merging with and joining said deck and leg corrugations.

3. In a sheet metal skid platform having a deck and marginal upright legs with corners therebetween formed integrally from a single metal blank, a relatively deep corrugation traversing the deck, a relatively deep corrugation extending upward in each leg, and two relatively shallow recessed corrugations running around a raised island-like corrugation in each corner, merging with and joining the deck and each leg corrugation.

4. In a sheet metal skid platform having a deck and legs with corners therebetween formed integrally from a single metal blank, a relatively deep corrugation traversing the deck, a relatively deep corrugation extending upward in each leg, and two relatively shallow tapered corrugations running around a corner merging with and joining said deck and a leg corrugation.

5. In a sheet metal skid platform having a deck and legs with corners therebetween formed integrally from a single metal blank, a relatively deep corrugation traversing the deck, a relatively deep corrugation extending upward in each leg, two relatively shallow and wide, tapered corrugations running around a corner merging with and joining the deck and a leg corrugation, and the grain of the metal in the sheet blank running parallel with said deck traversing corrugation.

CARL L. CLARK.
ALBERT G. KNOWLES.